2,837,412

PREPARATION OF IMPERVIOUS GRAPHITE BY LIQUID PHASE IMPREGNATION

George A. Bennett, Wheaton, Ill., assignor, by mesne assignments, to the United States of America as represented by the United States Atomic Energy Commission No Drawing. Application December 18, 1956
Serial No. 628,981

10 Claims. (Cl. 23—209.1)

My invention relates to a method of improving the physical properties of graphite, and more particularly to a method of increasing the density and imperviousness of graphite.

Graphite has numerous uses for which increased density, imperviousness and physical strength are desired. These range from lead pencils through generator brushes to electrodes. Another use of graphite of increasing importance is as a moderator material in a nuclear reactor. For information concerning the theory, construction and operation of nuclear reactors utilizing graphite as a moderator, reference is made to Glasstone, Principles of Nuclear Reactor Engineering, D. Van Nostrand and Company; U. S. Patent 2,708,656 to Fermi and Szillard; and to the Reactor Handbook (3 volumes), published May 1955, by the United States Atomic Energy Commission.

The requirements for graphite used in reactors are numerous and stringent. Included among these are that the graphite be of high purity to avoid contaminants having high thermal neutron cross sections (this is of more seriousness in natural uranium reactors than in those employing enriched material). The graphite should also be of high density and imperviousness for a number of reasons. Porous or low density material decreases the effective moderating capacity. One measure of this is the slowing down length, that is, the distance required for a fast neutron to be slowed to thermal energy; a longer slowing down length due to pervious and low density graphite might undesirably increase the volume of moderator or the fissionable material requirements of the reactor. Also, at elevated temperatures graphite is subject to oxidation in the presence of air and hence it is desirable that graphite have low permeability to air and to other vapors, such as gaseous fission products, which should not be permitted to escape the environs of the reactor. Finally, since advanced reactor technology is moving in the direction of employing liquid metals and alloys, such as sodium, bismuth, lead, and sodium-potassium as coolants, often directly through unsheathed channels in the graphite moderator, it is essential that the graphite be resistant to physical erosion and to coolant absorption, which latter occurrence would cause leakage from the reactor and decrease transfer and utilization of heat with possible damage to reactor components.

An object of my present invention, therefore, is to provide an improved method of increasing the imperviousness and density of graphite.

Another object is to provide an improved method of preparing such graphite by liquid impregnation followed by carbonization.

Another object is to provide an improved method of preparing such graphite which will not absorb liquid metals at elevated temperatures and which will be resistant to physical erosion.

Yet another object is to provide a relatively simple, reliable and efficient method for preparing such graphite.

Other objects and advantages of my invention will become apparent from the following detailed description and the claims appended hereto.

In accordance with my present invention, the imperviousness and density of graphite may be increased by saturating said graphite with a liquid furan ring compound, contacting the resulting impregnated body with aqueous hydrofluoric acid, and then drying the resulting improved graphite body.

Employing my invention, the density of graphite is markedly increased while the porosity is reduced to only a few percent of the original porosity. The graphite may be subjected to repeated cycles of molten metals or alloys at elevated temperatures without erosion or leakage due to permeability. Even subsequent heat treatments at very high temperatures (e. g., 2000° C.) does not appreciably increase the porosity. Having such unique advantages, my invention makes a significant contribution to graphite technology.

The organic compound used for impregnating the graphite and ultimately reducing pore size by carbon deposition is a liquid furan ring compound, especially those of relatively low molecular weight, that is, with relatively short length substituents and preferably not containing atoms other than carbon, hydrogen and oxygen. Satisfactory examples include furan and its aldehyde, alcohol, ketone and ether derivatives such as furfuryl alcohol, furfuryl methylether, furfuryl methyl ketone and furfural. Furfural is the single preferred reagent.

The graphite may be impregnated with the furan ring compound in a number of acceptable ways, one method being simply by immersion in the solution. The furan compound is conveniently introduced into the graphite under pressure. The pressure may suitably vary over a considerable range, a pressure in the neighborhood of 125 pounds per square inch being preferred. The atmosphere under which impregnation is conducted is not critical; nitrogen is a readily available and relatively cheap source of pressure for the impregnation. The saturation time under about 125 p. s. i. will be approximately two hours, although it is realized that this will vary with the size and nature of the graphite.

After the impregnation, the impregnated graphite is then contacted with aqueous hydrofluoric acid. The hydrofluoric acid splits the furan ring and leaches out any decomposition products, leaving carbon deposited in the pores. Other mineral acids are not as satisfactory in the cracking step and would leave atoms with high thermal neutron absorption cross sections. Various organic acids such as formic and acetic anhydride were tried, but with unsatisfactory results. Of all such materials, hydrofluoric acid is unique in the results obtained. The strength of the aqueous hydrofluoric acid may satisfactorily vary but the concentrated aqueous acid, say approximately 48–60% hydrofluoric acid, is preferred.

The time and temperature of the hydrofluoric acid treatment may satisfactorily vary over a considerable range while yet achieving good results. Thus, the temperature may vary between approximately minus 40° C. to approximately 100° C., and the time between approximately 10 to 50 hours. The best results are unexpectedly obtained at the lower temperatures (e. g., minus 10 to minus 30° C.) rather than at higher temperatures as might be thought, and operation at lower temperatures is, accordingly, preferred. While the reason for this action is not certain, there may be premature sealing of the pores when operating at elevated temperature.

A single saturation and cracking treatment followed by drying serves to considerably improve the properties of graphite. However, for exceptionally fine results, I find that a second saturation and cracking treatment, prior to drying, is highly desirable, resulting in a two-stage process. The temperature range for the final drying step is not critical. A temperature higher than approximately 200° C., while operative, is not found to be needed, and a temperature of approximately 80–120° C. is preferred.

In a preferred form of my invention, the density and imperviousness of graphite are improved by impregnating the graphite with furfural under a nitrogen pressure of approximately 125 p. s. i. at room temperature for approximately two hours. The impregnated body is then contacted with approximately 48–60% aqueous hydrofluoric acid at a temperature of approximately −10° C. to approximately −30° C. for approximately 10–50 hours. The impregnation and hydrofluoric acid treatments are repeated, and the resulting body is then dried at a temperature of approximately 80°–120° C.

The following examples are offered to illustrate my invention in greater detail.

EXAMPLES 1–6

Samples of commercial, reactor grade graphite were degassed, as is common practice, by heating at an elevated temperature under vacuum until no increase in gas pressure was observed. The samples were then placed in a pressure bomb, the air evacuated, and furfural added under a nitrogen pressure of 125 p. s. i. at the ambient temperature. After two hours the samples were removed and placed in aqueous hydrofluoric acid solution. The conditions of the hydrofluoric acid ring splitting treatment and the results obtained are shown in Table I, below.

*Table I*

| Example No. | Treatment | Drying Temp., °C. | Original Density, gm./cc. | Final Density, gm./cc. | Permeability, Percent Original |
|---|---|---|---|---|---|
| 1 | HF at 750° C. for 12 hr. | 80 | 1.68 | 1.79 | 7 |
| 2 | HF at Room Temperature for 41 hr. | 80 | 1.66 | 1.77 | 2 |
| 3 | HF at Room Temperature for 25 hr. | 120 | 1.66 | 1.76 | 2 |
| 4 | HF at Room Temperature for 25 hr. | 120 | 1.65 | 1.70 | 2 |
| 5 | HF at 75° C. for 25 hr. | 120 | 1.67 | 1.73 | 6 |
| 6 | HF at −15° C.[1] for 25 hr. | 120 | 1.65 | 1.76 | [2] |

[1] Actual cold bath varied from −10° C. to −30° C.
[2] Impervious to air under 74 cm. Hg pressure.

It can be seen from the foregoing table that the density of the final product was considerably increased and the permeability, as compared with the original sample, strikingly reduced.

As a test of the furfural-hydrofluoric acid treatment of the above samples, the samples were subjected to molten lead under high pressure in dynamic conditions. These conditions approximated the actual conditions of temperature, pressure, and flow which might be expected during actual reactor operation.

The apparatus used consisted of two pipe tanks (four inch diameter by twelve inch length) connected at the bottom through a treated, 0.088 inch thick graphite nipple. These tanks were connected at the top through solenoid valves to high pressure nitrogen. An automatic timer changed the setting of these valves so that the nitrogen alternately forced the molten lead through the nipple first in one direction and then in the other direction. In order to increase the effects of erosion, the molten metal impinged on the inner wall of the graphite nipple at a 45° angle. The lead was maintained at a temperature of approximately 300° C.; the total pressure was 8 atmospheres, so that a differential pressure of 7 atmospheres existed across the test specimen; and the pressure was cycled with a 15 second period.

The treated nipple survived twelve hundred cycles of molten lead over a period of about five hours showing no leaks whatsoever either through the nipple or cracks. Visual examination of the sample showed no deterioration of any kind due to erosion or any other cause; no lead was found in the graphite.

The effect of high temperatures was also checked, as shown in Table II, below. Even under this drastic treatment, where a large increase in permeability might result, the permeability was still but a fraction of the original value before impregnation.

*Table II*

EFFECT OF HIGH TEMPERATURE ON TREATED GRAPHITE SAMPLES

| Example No. | Temperature Treatment | Density Before Temp. Treatment, gm./cc. | Permeability Before Temp. Treatment, Percent Original | Density After Temp. Treatment, gm./cc. | Permeability After Temp. Treatment, Percent Original |
|---|---|---|---|---|---|
| 2 | 1000° C. for 2 hr. in muffle furnace in He atmosphere. | 1.77 | 2 | 1.73 | 22 |
| 3 | 1070° C. for 20 min. in induction furnace in He atmosphere. | 1.76 | 2 | 1.72 | 7 |

The above examples are only illustrative and not limitative. It should be understood that those skilled in the art may make variations that are still within the spirit of my invention. Therefore, my invention should be understood to be limited only as is indicated by the appended claims.

Having thus described my invention, I claim:

1. An improved method of increasing the density and imperviousness of graphite, which comprises saturating said graphite with a liquid furan ring compound consisting of carbon, hydrogen and oxygen, contacting the resulting impregnated graphite with aqueous hydrofluoric acid and then drying the resulting treated graphite.

2. The method of claim 1, wherein said impregnation and hydrofluoric acid treatments are repeated prior to said drying.

3. The method of claim 1, wherein said furan ring compound is of relatively low molecular weight.

4. The method of claim 3, wherein said furan compound is selected from the group consisting of furfural, furfuryl alcohol, and furfuryl methylether.

5. The method of claim 1, wherein said furan compound is furfural.

6. An improved method of increasing the density, imperviousness, and purity of graphite, which comprises saturating said graphite with furfural under pressure, contacting the resulting impregnated graphite with concentrated aqueous hydrofluoric acid at a temperature of approximately −40° C. to approximately 100° C. for approximately 10–50 hours, and then drying the resulting treated graphite.

7. The method of claim 6, wherein said drying is conducted at a temperature of approximately 80–120° C.

8. The method of claim 6, wherein the hydrofluoric acid treatment is conducted at a temperature of approximately −10° C. to −30° C.

9. The method of claim 6, wherein the impregnation and hydrofluoric acid steps are repeated prior to said drying.

10. An improved method of increasing the density and imperviousness of graphite which comprises impregnating said graphite with furfural under nitrogen at a pressure of approximately 125 p. s. i. at the ambient atmospheric temperature for approximately two hours, contacting the resulting impregnated graphite with approximately 48-60% hydrofluoric acid at a temperature of approximately $-10°$ C. to $-30°$ C. for approximately 10-50 hours, repeating the foregoing steps, and then drying the resulting graphite at a temperature of approximately 80° C. to 120° C.

References Cited in the file of this patent

UNITED STATES PATENTS

| | | |
|---|---|---|
| 1,037,901 | Hansen | Sept. 10, 1912 |
| 2,087,724 | Sanders | July 20, 1937 |

FOREIGN PATENTS

| | | |
|---|---|---|
| 550,379 | Great Britain | Jan. 5, 1943 |

OTHER REFERENCES

Nothans, United States Atomic Energy Commission Report COO-202, Sept. 2, 1954.